United States Patent
Pasupathy et al.

(10) Patent No.: US 8,499,132 B1
(45) Date of Patent: Jul. 30, 2013

(54) SOFTWARE MODULE FOR USING FLASH MEMORY AS A SECONDARY PERMANENT STORAGE DEVICE

(75) Inventors: Shankar Pasupathy, Sunnyvale, CA (US); Garth Goodson, Fremont, CA (US); Kaladhar Voruganti, San Jose, CA (US); Kiran Srinivasan, Cupertino, CA (US)

(73) Assignee: NetApp, Inc., Sunnyvale, CA (US)

( * ) Notice: Subject to any disclaimer, the term of this patent is extended or adjusted under 35 U.S.C. 154(b) by 1351 days.

(21) Appl. No.: 12/030,168

(22) Filed: Feb. 12, 2008

Related U.S. Application Data

(60) Provisional application No. 61/028,107, filed on Feb. 12, 2008, provisional application No. 61/028,094, filed on Feb. 12, 2008.

(51) Int. Cl.
*G06F 12/02* (2006.01)

(52) U.S. Cl.
USPC .................... 711/165; 711/103; 711/170

(58) Field of Classification Search
USPC .................... 711/103, 165, 170
See application file for complete search history.

(56) References Cited

U.S. PATENT DOCUMENTS

| 7,644,242 B2 * | 1/2010 | Asano et al. ............... 711/161 |
| 2007/0033362 A1 * | 2/2007 | Sinclair .................. 711/165 |

OTHER PUBLICATIONS

Eran Gal and Sivan Toledo, Algorithms and Data Structures for Flash Memories, ACM Computing Surveys (CSUR) Archive, Jun. 2005, pp. 138-163, vol. 37, Issue 2, Publisher ACM, New York City, NY, USA.

* cited by examiner

*Primary Examiner* — Jared Rutz
(74) *Attorney, Agent, or Firm* — Stattler-Suh PC

(57) ABSTRACT

Described herein is a flash remapping (FR) layer in a storage operating system for utilizing flash memory as a secondary permanent storage device in a storage system. The FR layer collects particular information (specified by collection parameters) of received access requests for data stored on primary storage devices of the storage system. Based on the collected information and a predetermined access pattern (specified by pattern parameters), the FR layer selects data sets on the primary storage devices to be transferred permanently to flash memory, whereby subsequent access requests to the selected data sets are redirected to flash memory. New parameters may be received by the FR layer (from a user or program) to dynamically reconfigure the functions of the FR layer. The FR layer may be implemented in the operating system without requiring other code of the storage operating system to be modified.

20 Claims, 8 Drawing Sheets

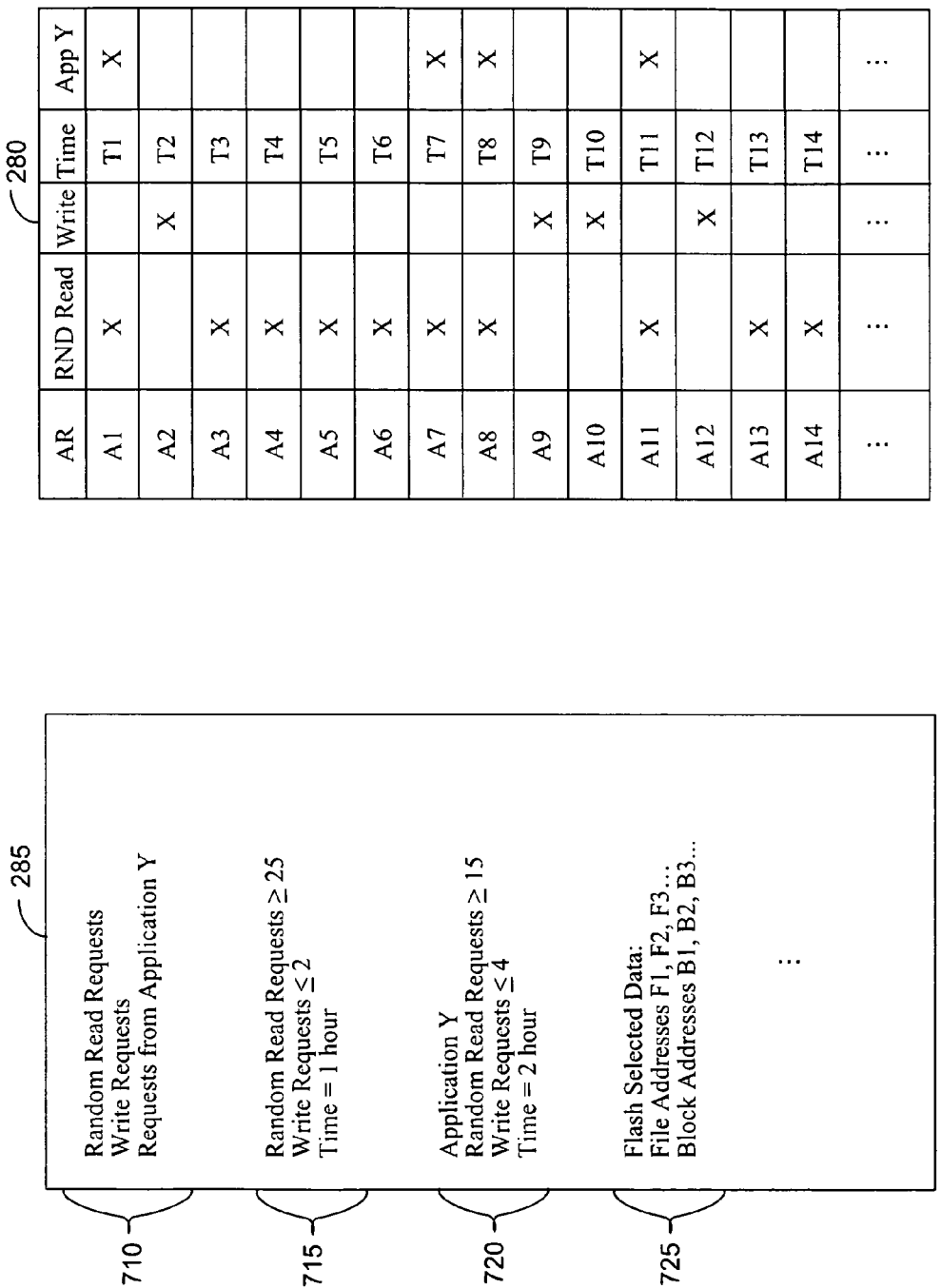

SOFTWARE MODULE FOR USING FLASH MEMORY AS A SECONDARY PERMANENT STORAGE DEVICE

RELATED APPLICATIONS

This application is related to U.S. Provisional Patent Application No. 61/028,107 filed Feb. 12, 2008 entitled "Hybrid Media Storage System Architecture," by Jeff Kimmell, et al., and U.S. Provisional Patent Application No. 61/028,094 filed Feb. 12, 2008 entitled "Cache-Based Storage System Architecture," by Steve Kleiman, et al., both filed herewith.

FIELD OF THE INVENTION

The present invention relates to storage systems, and particularly, to a software module for using flash memory as a secondary permanent storage device.

BACKGROUND OF THE INVENTION

A storage system is a processing system adapted to store and retrieve data on storage devices (such as disks). The storage system includes a storage operating system that implements a file system to logically organize the data as a hierarchical structure of directories and files on the storage devices. Each file may be implemented as a set of blocks configured to store data (such as text), whereas each directory may be implemented as a specially-formatted file in which data about other files and directories are stored.

The storage operating system generally refers to the computer-executable code operable on a storage system that manages data access and access requests (read or write requests requiring input/output operations) and may implement file system semantics in implementations involving storage systems. In this sense, the Data ONTAP® storage operating system, available from Network Appliance, Inc. of Sunnyvale, Calif., which implements a Write Anywhere File Layout (WAFL®) file system, is an example of such a storage operating system implemented as a microkernel within an overall protocol stack and associated storage. The storage operating system can also be implemented as an application program operating over a general-purpose operating system, such as UNIX® or Windows®, or as a general-purpose operating system with configurable functionality, which is configured for storage applications as described herein.

A storage system's storage is typically implemented as one or more storage volumes that comprise physical storage devices, defining an overall logical arrangement of storage space. Available storage system implementations can serve a large number of discrete volumes. A storage volume is "loaded" in the storage system by copying the logical organization of the volume's files, data, and directories, into the storage system's memory. Once a volume has been loaded in memory, the volume may be "mounted" by one or more users, applications, devices, and the like, that are permitted to access its contents and navigate its namespace.

A storage system may be configured to allow server systems to access its contents, for example, to read or write data to the storage system. A server system may execute an application that "connects" to the storage system over a computer network, such as a shared local area network (LAN), wide area network (WAN), or virtual private network (VPN) implemented over a public network such as the Internet. The application executing on the server system may send an access request (read or write request) to the storage system for accessing particular data stored on the storage system.

When performing access requests received from the server systems, a conventional storage system may also use flash memory (non-volatile, rewritable computer memory) as a cache device. However, conventional use of flash memory as cache devices do not exploit the particular characteristics and advantages of flash memory. Also, typically the software code of the operating system of a storage system is modified to implement flash memory as a cache device. As such, there is a need for a method and apparatus for utilizing the particular characteristics and advantages of flash memory other than use as a cache device and that also does not require the operating system of a storage system to be modified.

SUMMARY OF THE INVENTION

A method for utilizing flash memory as a secondary permanent storage device in a storage system is described herein. In some embodiments, a flash remapping (FR) layer in the operating system of the storage system is used to collect information ("access-request information") regarding access requests for data stored on one or more primary storage devices of the storage system. Based on access patterns reflected in the collected access-request information, the FR layer may select particular data sets (e.g., particular blocks of data) in one or more primary storage devices to be transferred and stored permanently to the flash memory, thereby utilizing the non-volatile characteristic of flash memory. In some embodiments, the FR layer may be implemented in the storage operating system without requiring other code of the storage operating system (including the file system) of the storage system to be modified.

In some embodiments, the storage operating system contains the FR layer that operates in conjunction with the other software layers and file system of the storage operating system to use flash memory as a secondary permanent storage device. In these embodiments, other than adding the FR layer to the storage operating system, the FR layer is implemented to do such without otherwise requiring code modification of the file system or other layers of the storage operating system. The FR layer may be configured to receive as input access-request information from a prior adjacent layer of the storage operating system and output the same access-request information received as input to a next adjacent layer of the storage operating system. As such, each software layer of the storage operating system that is adjacent to the FR layer may produce as output or receive as input the same access-request information as before. Thus the adjacent software layers function in the same manner as before and do not require modification to interact with the FR layer.

For example, in some embodiments, the FR layer may reside between a file system layer and a storage layer of the storage operating system. In these embodiments, the FR layer may receive as input and produce as output, file-based access-request information. As a further example, in some embodiments, the FR layer may reside between the storage layer and a device driver layer of the storage operating system. In these embodiments, the FR layer may receive as input and produce as output, block-based access-request information.

In some embodiments, the FR layer comprises a collection and selection module, a remapping module, and a redirecting module. The collection and selection module of the FR layer may collect the access-request information and determine (using the collected access-request information) whether particular data sets on the one or more primary storage devices are accessed according to a predetermined access pattern. A data set having the predetermined access pattern may be selected by the FR layer for transfer to flash memory (referred to herein as "flash selected data"). For example, the FR layer may select data sets that are accessed frequently by random read requests. As such, as access-request information is collected by the FR layer, the FR layer also searches the collected access-request information for data sets in the primary storage devices exhibiting the predetermined access pattern.

In some embodiments, the flash selected data (having the predetermined access pattern) may be accessed with lower power consumption and/or lower latency from flash memory than from the primary storage devices. In these embodiments, the predetermined access pattern may be determined based on the performance characteristics of flash memory in comparison to the primary storage device type. For example, as known in the art, relative to disk drives, flash memory has relatively low latency in performing random read requests and relatively high latency in performing write requests (random or sequential). As such, when the primary storage device is a disk drive, these performance characteristics of flash memory may be leveraged by the FR layer by choosing, as data sets for transfer to flash memory, data sets that are accessed frequently by random read requests and accessed infrequently by write requests.

In some embodiments, the predetermined access pattern by default is a relatively high frequency of random read requests and a relatively low frequency of write requests for a data set. In other embodiments, the predetermined access pattern is specified by one or more "pattern parameters" that are received by the FR layer (e.g., from a user or a program) that may dynamically change the predetermined access pattern. In some embodiments, a pattern parameter may specify a type of access request (e.g., random read request) and a minimum or maximum threshold value. The threshold value may indicate a minimum or maximum number of access requests of the specified type that may be received for a data set for it to be selected as flash selected data. In further embodiments, a pattern parameter may specify a time period (T) in which the predetermined access pattern must occur for a data set to qualify as flash selected data.

In general, parameters of various types may be received by the FR layer and stored in a parameter file. The various received parameters may specify operational parameters of the FR layer to dynamically change the functions of the FR layer in collecting access-request information and/or determining data sets for transfer to flash memory. In these embodiments, the received parameters may dynamically change the functions of the FR layer without requiring the software code of the FR layer to be modified to change its functions. In some embodiments, the parameters vary and are determined based on the type of primary storage device (e.g., magnetic tape, disk, etc.) used in the storage system. The parameters may vary to appropriately leverage the performance characteristics of flash memory relative to the performance characteristics of the type of primary storage device.

In some embodiments, the flash memory may be used as a secondary storage device to permanently store flash selected data from the one or more primary storage devices of the storage system. In some embodiments, after being transferred from the primary storage device and stored to the flash memory, flash selected data may optionally be deleted from the primary storage device on which it was originally stored. In these embodiments, data is stored on either a primary storage device or a secondary storage device, but is not concurrently stored on both a primary and secondary storage device. Also, after being transferred to flash memory, any subsequent access requests to the flash selected data are redirected from the primary storage device (on which it was originally stored) to the flash memory.

As described above, the FR layer may utilize the non-volatile characteristic of flash memory to use flash memory as a secondary and alternative permanent storage device in a storage system for flash selected data. Parameters received by the FR layer may specify parameters that leverage the particular characteristics and advantages of flash memory relative to a primary storage device type used in the storage system. As specified by the parameters, the FR layer may select data sets that may be accessed with lower power consumption and/or lower latency by flash memory compared to the primary storage device. As such, the overall performance and efficiency of the storage system in performing access requests may be improved by implementing flash memory and the FR layer. Also, the FR layer may be implemented in the storage operating system without requiring other code of the storage operating system to be modified. The FR layer utilizes the flash memory device so that the flash memory device and primary storage devices operate together in a way that is transparent to applications submitting access request to the storage system.

BRIEF DESCRIPTION OF THE DRAWINGS

The novel features are set forth in the appended claims. However, for purpose of explanation, several embodiments of the invention are set forth in the following figures.

FIG. 7 shows an exemplary parameter file containing various types of parameters that may be received by the FR layer;

FIG. 8 shows an exemplary data collection table that collects and classifies access-request information;

DETAILED DESCRIPTION

In the following description, numerous details are set forth for purpose of explanation. However, one of ordinary skill in the art will realize that the embodiments described herein may be practiced without the use of these specific details. In other instances, well-known structures and devices are shown in block diagram form in order not to obscure the description with unnecessary detail.

The description that follows is divided into three sections. Section I describes a storage system environment in which some embodiments operate. Section II describes a storage operating system having a flash remapping (FR) layer for utilizing flash memory as a secondary permanent storage device in a storage system. Section III describes methods for utilizing flash memory as a secondary permanent storage device in a storage system.

I. Storage System Environment

Figure 1:
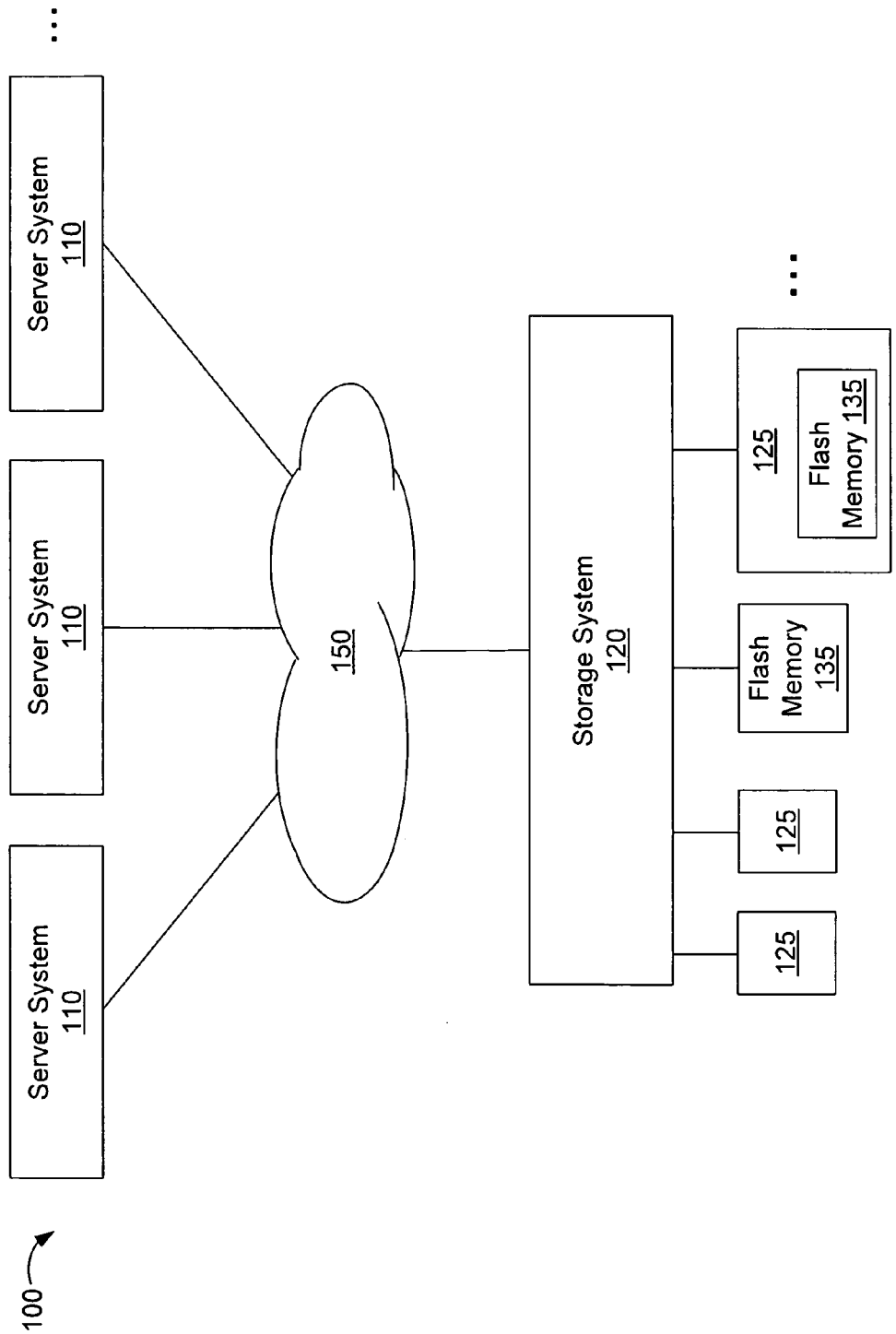
FIG. 1 is a schematic block diagram of an exemplary storage system environment in which some embodiments operate.

FIG. 1 is a schematic block diagram of an exemplary storage system environment 100 in which some embodiments operate. The environment 100 comprises a one or more server systems 110 and a storage system 120 (comprising one or more primary storage devices 125 and one or more secondary storage devices 135) that are connected via a connection system 150. The connection system 150 may comprise a network, such as a Local Area Network (LAN), Wide Area Network (WAN), metropolitan area network (MAN), the Internet, or any other type of network or communication system between computer systems.

A server system 110 may comprise a computer system that utilizes services of the storage system 120 to store and manage data in the storage devices of the storage system 120. A server system 110 may execute one or more applications that submit access requests for accessing particular data on the storage devices 125 of the storage system 120. Interaction between a server system 110 and the storage system 120 can enable the provision of storage services. That is, server system 110 may request the services of the storage system 120 (e.g., through read or write requests), and the storage system 120 may return the results of the services requested by the server system 110, by exchanging packets over the connection system 150. The server system 110 may request the services of the storage system by issuing packets using file-based access protocols, such as the Common Internet File System (CIFS) protocol or Network File System (NFS) protocol, over the Transmission Control Protocol/Internet Protocol (TCP/IP) when accessing information in the form of files and directories. Alternatively, the server system 110 may issue packets including block-based access protocols, such as the Fibre Channel Protocol (FCP), or Internet Small Computer System Interface (iSCSI) Storage Area Network (SAN) access, when accessing information in the form of blocks.

The storage system 120 may comprise a computer system that stores data in a set of one or more primary storage devices 125. A primary storage device 125 may comprise a writable storage device media, such as magnetic disks, video tape, optical, DVD, magnetic tape, and any other similar media adapted to store information (including data and parity information). For illustrative purposes, the primary storage device 125 is sometimes described herein as a disk. However, in other embodiments, the primary storage device 125 may comprise any other type of storage device. In some embodiments, the storage system 120 also stores data in a set of one or more secondary storage devices 135, a secondary storage device 135 comprising a flash memory device.

The storage system 120 may implement a file system to logically organize the data as a hierarchical structure of directories and files on each primary and secondary storage device 125 and 135. Each file may be implemented as a set of blocks configured to store data, whereas each directory may be implemented as a specially-formatted file in which information about other files and directories are stored. In some embodiments, a file system specific for flash memory is implemented on a secondary storage device 135, such as Journalling Flash File System (JFFS), JFFS2, Yet Another Flash File System (YAFFS), etc.

As used herein, a secondary storage device 135 is used to permanently store particular data sets (flash selected data) stored on the one or more primary storage devices 125, the particular data sets being selected and transferred to the secondary storage device 135 by a flash-remapping layer (FR layer) that resides on the storage operating system (as discussed further below). In some embodiments, the FR layer may select flash selected data on a block basis, whereby each selected block comprises a fixed-sized amount of data (e.g., a 4-kilobyte (KB) or 8 KB data block). After transferring flash selected data to flash memory, the FR layer then redirects access requests for the flash selected data to the flash memory. As known in the art, the secondary storage device 135 may implement a sub-system for performing various input/output operations (such as transferring/storing data onto the secondary storage device 135 and for later accessing data on the secondary storage device 135). The sub-system may comprise a device driver, file system, and other software layers for performing the various input/output operations. The secondary storage device 135 is sometimes referred to herein as an alternative storage device or a flash memory device.

The flash memory device may comprise a separate (stand-alone) secondary storage device 135 or may be integrated as part of a primary storage device 125 (such as a hybrid drive comprising a flash memory and a magnetic storage combined in a single device). As discussed below in relation to FIG. 2, a flash memory device may also reside in the storage system's internal architecture and be connected with the system bus (e.g., as a flash memory module on a card). The FR layer may utilize the flash memory in a similar manner, regardless of the configuration or location of the flash memory, so that the flash memory and primary storage device(s) 125 operate together in a way that is transparent to applications accessing data stored on the storage system 120.

The flash memory device may comprise a non-volatile, rewritable computer memory (i.e., a computer memory that does not require power to maintain information stored in the computer memory and may be electrically erased and reprogrammed). Conventional use of flash memory as cache devices do not leverage the non-volatile and high reliability characteristics of flash memory and are typically used to only temporarily store data. In some embodiments, the non-volatile characteristic of flash memory is utilized by implementing flash memory in the storage system 120 as a permanent storage device for permanently storing data. In these embodiments, after being transferred from the primary storage device 125 and stored to the flash memory, flash selected data may optionally be deleted from the primary storage device 125 on which it was originally stored. In further embodiments, any subsequent write requests to flash selected data are performed only on the flash memory and are not performed (at any point in time) on the primary storage device on which the flash selected data was originally stored.

Flash memory, however, may be more costly (for a given amount of data storage) than some types of primary storage devices. Given the relatively higher cost of flash memory, the FR layer should be selective in determining which data should be transferred from a primary storage device to the flash memory for permanent storage. In some embodiments, only those data sets on the primary storage devices that may be accessed with higher performance (e.g., lower power consumption and/or lower latency) from a flash memory are selected for transfer.

As known in the art, flash memory may exhibit particular characteristics and performance advantages over other types of storage devices. For example, flash memory typically has better random read access times than a disk, whereas a disk typically has better write access times (for random and sequential writes) than flash memory. As such, if the primary storage device 125 comprises a disk, data sets on the disk selected for transfer may comprise data sets having a predetermined access pattern of a high frequency of random read requests and a low frequency of write requests. As the performance advantages of flash memory vary relative to the type of primary storage device, the predetermined access pattern used for selecting data sets for transfer may also vary depending on the type of the primary storage device. As discussed below, the type of access pattern targeted for selection (referred to as the predetermined access pattern) may be dynamically changed using parameters that are received by the FR layer, without requiring code modification of the FR layer.

Figure 2:
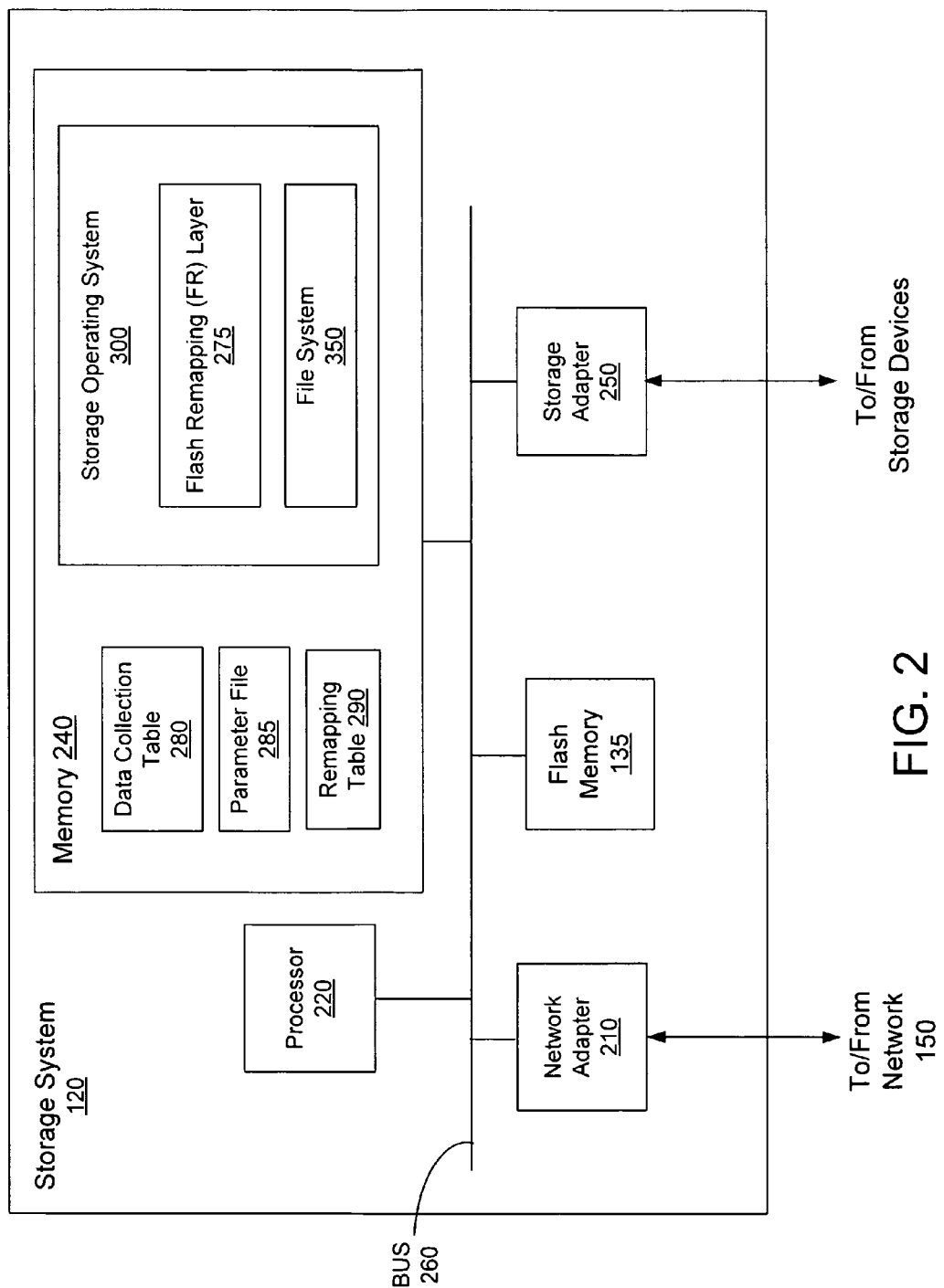
FIG. 2 is a schematic block diagram of an exemplary storage system that may be employed in the storage system environment of FIG. 1.

FIG. 2 is a schematic block diagram of an exemplary storage system 120 that may be employed in the storage system environment of FIG. 1. The storage system 120 comprises a network adapter 210, a processor 220, a memory 240, and a storage adapter 250 interconnected by a system bus 260. In some embodiments, the storage system 120 further comprises a flash memory device 135 that resides in the storage system's internal architecture and is connected with the system bus 260. For example, the flash memory device 135 may be a flash memory module on a Peripheral Component Interconnect (PCI) or PCI eXtended (PCI-X) card that is connected with the system bus 260.

Those skilled in the art will understand that the embodiments described herein may apply to any type of special-purpose computer (e.g., storage system) or general-purpose computer, including a standalone computer, embodied or not embodied as a storage system. To that end, storage system 120 can be broadly, and alternatively, referred to as a computer system. Moreover, the teachings of the embodiments described herein can be adapted to a variety of storage system architectures including, but not limited to, a network-attached storage environment, a storage area network and disk assembly directly-attached to a server computer. The term "storage system" should, therefore, be taken broadly to include such arrangements.

The network adapter 210 comprises the mechanical, electrical and signaling circuitry needed to connect the storage system 120 to a server system 110 over a computer network 150. The storage system may include one or more network adapters. Each network adapter 210 has a unique IP address and may provide one or more data access ports for server systems 110 to access the storage system 120 (where the network adapter accepts read/write access requests from the server systems 110 in the form of data packets). The memory 240 comprises storage locations that are addressable by the processor 220 and adapters for storing software program code and data. The memory 240 may comprise a form of random access memory (RAM) that is generally cleared by a power cycle or other reboot operation (e.g., it is a "volatile" memory). In other embodiments, however, the memory 240 may comprise a non-volatile form of memory that does not require power to maintain information. The processor 220 and adapters may, in turn, comprise processing elements and/or logic circuitry configured to execute the software code and manipulate the data stored in the memory 240.

The processor 220 executes a storage operating system application 300 of the storage system 120 that functionally organizes the storage system by, inter alia, invoking storage operations in support of a file service implemented by the storage system. In some embodiments, the storage operating system 300 comprises a plurality of software layers (including a flash remapping (FR) layer 275 and a file system layer 350) that are executed by the processor 220. In some embodiments, the FR layer 275 is implemented to use a flash memory device as a secondary permanent storage device 135 without requiring code modification of the file system layer 350 or other layers of the storage operating system 300. Portions of the storage operating system 300 are typically resident in memory 240. It will be apparent to those skilled in the art, however, that other processing and memory means, including various computer readable media, may be used for storing and executing program instructions pertaining to the operating system 300.

In some embodiments, a data collection table 280, a parameter file 285, and a remapping table 290 are also resident in memory 240. As discussed below, the data collection table 280 is created and used by the FR layer 275 to store/collect and classify information (access-request information) of received access requests for primary storage devices of the storage system. The access-request information stored in the data collection table 280 is then used by the FR layer 275 to select data sets (flash selected data) on the primary storage devices 125 that exhibit a predetermined access pattern for transfer to the flash memory device 135. In some embodiments, the predetermined access pattern is specified by pattern parameters that are received by the FR layer 275 and stored to the parameter file 285. As discussed below, the remapping table 290 is created and used by the FR layer 275 to record transfers/remappings of flash selected data and to then redirect subsequent access requests for flash selected data from the primary storage device 125 to the flash memory device 135.

The storage adapter 250 cooperates with the storage operating system 300 executing on the storage system 120 to access data requested by the server system 110. The data may be stored on the storage devices 125 and 135 that are attached, via the storage adapter 250, to the storage system 120 or other node of a storage system as defined herein. The storage adapter 250 includes input/output (I/O) interface circuitry that couples to the storage devices 125 and 135 over an I/O interconnect arrangement, such as a conventional high-performance, Fibre Channel serial link topology. In response to an access request received from a server system 110, data may be retrieved by the storage adapter 250 and, if necessary, processed by the processor 220 (or the adapter 250 itself) prior to being forwarded over the system bus 260 to the network adapter 210, where the data is formatted into a packet and returned to the server system 110.

In an illustrative embodiment, the primary storage devices 125 may comprise disks that are arranged into a plurality of volumes, each having a file system associated therewith. In one embodiment, the storage devices 125 comprise disks that are configured into a plurality of RAID (redundant array of independent disks) groups whereby multiple primary storage devices 125 are combined into a single logical unit (i.e., RAID group). In a typical RAID group, primary storage devices 125 of the group share or replicate data among the disks which may increase data reliability or performance. The primary storage devices 125 of a RAID group are configured so that some disks store striped data and at least one disk stores separate parity for the data, in accordance with a preferred RAID-4 configuration. However, other configurations (e.g. RAID-5 having distributed parity across stripes, RAID-DP, etc.) are also contemplated. A single volume typically comprises a plurality of primary storage devices 125 and may be embodied as a plurality of RAID groups.

The organization of a storage operating system 300 for the exemplary storage system 120 is now described briefly. However, it is expressly contemplated that the principles of the embodiments described herein can be implemented using a variety of alternative storage operating system architectures. As discussed above, the term "storage operating system" as used herein with respect to a storage system generally refers to the computer-executable code operable on a storage system and manages data access. In this sense, Data ONTAP® software is an example of such a storage operating system implemented as a microkernel. The storage operating system can also be implemented as an application program operating over a general-purpose operating system, such as UNIX® or Windows®, or as a general-purpose operating system with configurable functionality.

Figure 3:
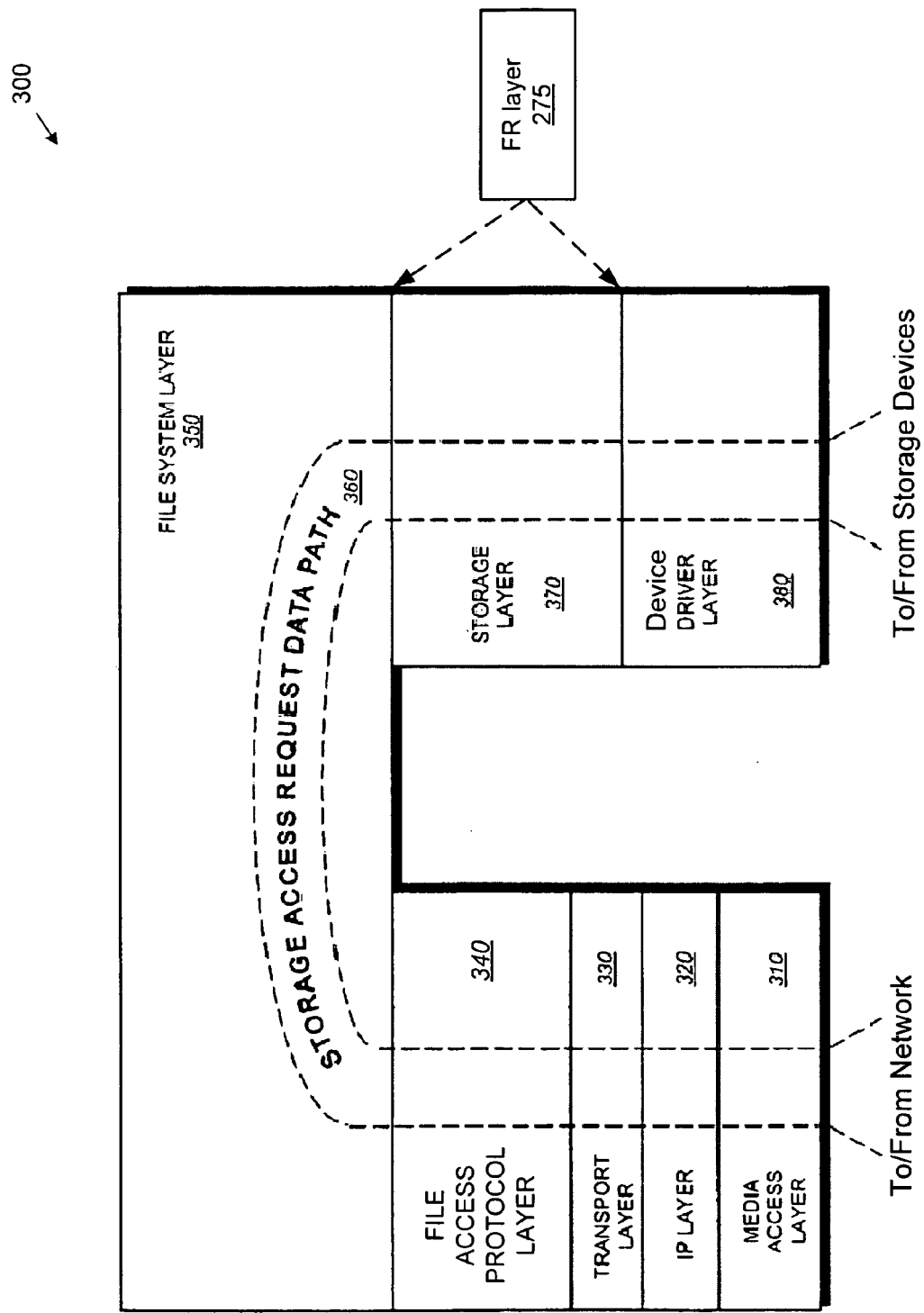
FIG. 3 is a schematic block diagram of an exemplary storage operating system that may be implemented by the storage system in FIG. 2.

As shown in FIG. 3, the storage operating system 300 comprises a series of software layers that form an integrated protocol software stack. The protocol stack provides data paths 360 for server systems 110 to access data stored on the storage system 120 using file-access protocols. The protocol stack includes a media access layer 310 of network drivers (e.g., an Ethernet driver). The media access layer 310 interfaces with network communication and protocol layers, such as the Internet Protocol (IP) layer 320 and the transport layer 330 (e.g., TCP/UDP protocol). The IP layer 320 may be used to provide one or more data access ports for server systems 110 to access the storage system 120. In some embodiments, the IP layer 320 layer provides a dedicated private port for each of one or more remote-file access protocols implemented by the storage system 120.

A file-access protocol layer 340 provides multi-protocol data access and, for example, may include support for the Hypertext Transfer Protocol (HTTP) protocol, the NFS protocol, and the CIFS protocol. The storage operating system 300 may include support for other protocols, including, but not limited to, the direct access file system (DAFS) protocol, the web-based distributed authoring and versioning (WebDAV) protocol, the Internet small computer system interface (iSCSI) protocol, and so forth. The storage operating system 300 may manage the primary storage devices 125 using a storage layer 370 that implements a storage protocol (such as a RAID protocol) and a device driver layer 380 that implements a device control protocol (such as small computer system interface (SCSI), integrated drive electronics (IDE), etc.).

Bridging the storage device software layers with the network and file-system protocol layers is a file system layer 350 of the storage operating system 300. In an illustrative embodiment, the file system layer 350 implements a file system having an on-disk format representation that is block-based using, for example, 4 KB data blocks and using inodes to describe the files. An inode is a data structure used to store information about a file, such as ownership of the file, access permission for the file, size of the file, name of the file, location of the file, etc. In response to receiving a file-access request, the file system generates operations to load (retrieve) the requested data from storage devices 125 (if it is not resident in the storage system's memory 240). An external file handle in the access request typically identifies a file or directory requested by the server system 110. Specifically, the file handle may specify a generation number, inode number and volume number corresponding to the requested data.

If the information is not resident in the storage system's memory 240, the file system layer 350 indexes into an inode file using the received inode number to access an appropriate entry and retrieve a logical volume block number. The file system layer 350 then passes the logical volume block number to the storage layer 370, which maps that logical number to a block number and sends the latter to an appropriate driver (for example, an encapsulation of SCSI implemented on a fibre channel interconnection) of the device driver layer 380. The device driver layer 380 accesses the block number from storage devices 125 and loads the requested data in memory 240 for processing by the storage system 120. Upon successful completion of the request, the storage system (and storage operating system) returns a response, e.g., a conventional acknowledgement packet defined by the CIFS specification, to the server system 110 over the network 150.

It should be noted that the software "path" 360 through the storage operating system layers described above needed to perform data storage access for the requests received at the storage system may alternatively be implemented in hardware or a combination of hardware and software. That is, in an alternative embodiment, the storage access request path 360 may be implemented as logic circuitry embodied within a field programmable gate array (FPGA) or an application specific integrated circuit (ASIC). This type of hardware implementation may increase the performance of the file service provided by storage system 120 in response to a file system request packet issued by server system 110. Moreover, in a further embodiment, the processing elements of network and storage adapters 210 and 250 may be configured to offload some or all of the packet processing and storage access operations, respectively, from processor 220 to thereby increase the performance of the data access service provided by the storage system.

In some embodiments, the storage operating system 300 also comprises a flash remapping (FR) layer 275 that operates in conjunction with the other software layers and file system of the storage operating system 300 to use a flash memory device 135 as a secondary permanent storage device in the storage system 120. For example, in some embodiments, the FR layer 275 may reside between the file system layer 350 and the storage layer 370 of the storage operating system 300. In these embodiments, the FR layer 275 may receive as input and produce as output, file-based access-request information. As a further example, in some embodiments, the FR layer 275 may reside between the storage layer 370 and the device driver layer 380 of the storage operating system 300. In these embodiments, the FR layer 275 may receive as input and produce as output, block-based access-request information.

In some embodiments, the FR layer 275 may be pre-included in storage operating system 300 software. In other embodiments, the FR layer 275 may comprise an external auxiliary plug-in type software module that works with the storage operating system 300 to enhance its functions. In these embodiments, the FR layer 275 software module may be installed onto a present storage operating system 300 without otherwise requiring code modification of the storage operating system 300. As such, the FR layer 275 may be imposed upon any existing storage operating system 300 and file system to use a flash memory device 135 as a secondary permanent storage device.

II. Flash Remapping Layer of Storage Operating System

Typically, the software layers of the storage operating system 300 processes received access requests in a predetermined sequential order by communicating with each other using various protocols. In processing a received access request, a software layer may receive as input particular access-request information from a previous software layer. After processing the received access-request information, the software layer may then output particular access-request information to a next software layer that further processes the received access-request information. For example, the file system layer 350 may receive as input particular access-request information from the file-access protocol layer 340. The file system layer 350 processes the received access-request information and produces as output particular access-request information which is received and further processed by the storage layer 370, and so forth.

As discussed above, the FR layer 275 operates in conjunction with the other software layers of the storage operating system 300 to utilize flash memory 135 as a secondary permanent storage device. Other than adding the FR layer 275 to the storage operating system 300, the FR layer 275 is implemented to do such without otherwise requiring code modification of the file system layer 350 or other layers of the storage operating system 300. In some embodiments, the FR layer 275 may be configured to receive as input access-request information from a prior adjacent layer of the storage operating system and output the same access-request information (that was received as input) to a next adjacent layer of the storage operating system. As such, each software layer of the storage operating system 300 that is adjacent to the FR layer 275 may produce as output or receive as input the same access-request information as before (i.e., when the FR layer 275 was not installed on the storage operating system 300) and function in the same manner as before. As such, the other software layers of the storage operating system 300 may function in the same manner and need not be modified to interact with the FR layer 275.

As used herein, an adjacent software layer refers to a software layer of the storage operating system 300 that sends or receives access-request information directly to or directly from the FR layer 275. Adjacent software layers vary depending on where in the software stack of the storage operating system 300 the FR layer 275 resides. Also, the particular format (e.g., file-based or block-based format) of the access-request information that the FR layer 275 is configured to receive as input and produce as output also depends on where in the software stack of the storage operating system 300 the FR layer 275 resides.

Figure 4:
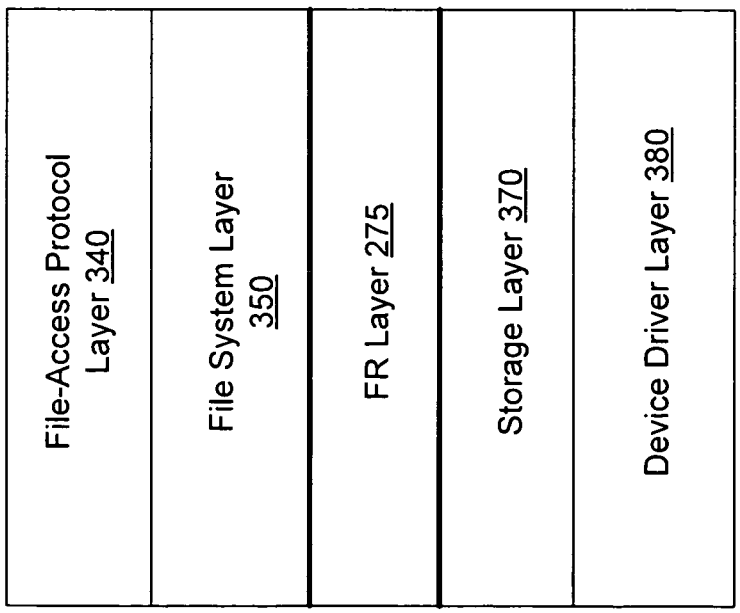
FIG. 4 shows a conceptual diagram where the FR layer resides between the file system layer and the storage layer of the storage operating system.

To illustrate, FIG. 4 shows a conceptual diagram of an example where the FR layer 275 resides between the file system layer 350 and the storage layer 370 of the storage operating system 300. In these embodiments, the FR layer 275 may receive as input and produce as output, file-based access-request information. Such file-based access-request information may include, for example, a request descriptor, file descriptor, address offset, and data length. The request descriptor may specify whether the received access request is a read or write request. The file descriptor may comprise a unique file identifier that specifies a particular file stored on the storage system 120 (whereby the file system 350 may assign a unique file identifier for each file in a given volume). The address offset may comprise an offset amount (relative to the beginning of the specified file at offset 0) that specifies the starting point from which data in the specified file is to be read or written. The data length may specify the amount of data to be read or written in the specified file starting from the address offset.

Figure 5:
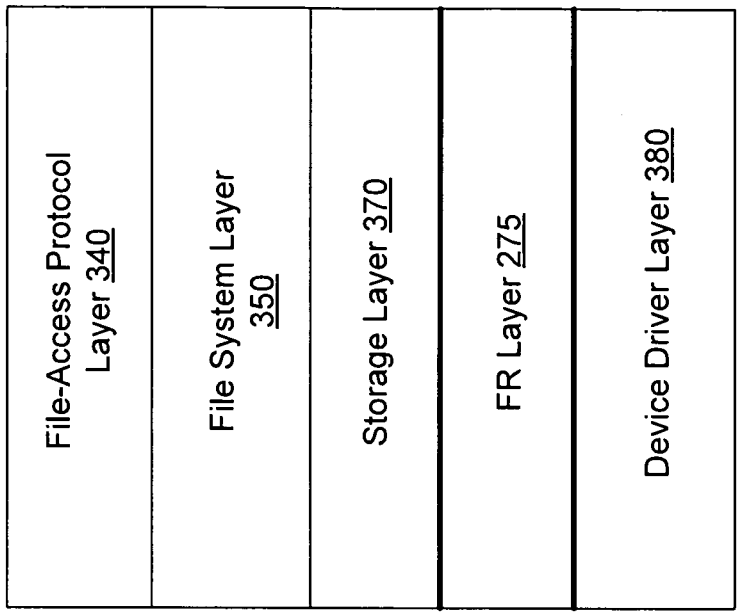
FIG. 5 shows a conceptual diagram where the FR layer resides between the storage layer and the device driver layer of the storage operating system.

FIG. 5 shows a conceptual diagram of a further example where the FR layer 275 resides between the storage layer 370 and the device driver layer 380 of the storage operating system 300. In these embodiments, the FR layer 275 may receive as input and produce as output, block-based access-request information. Such block-based access-request information may include, for example, a request descriptor, logical block address, and data size. The logical block address may specify a data block that is the starting point from which data is to be read or written. The data size may specify the amount of data to be read or written starting from the logical block address.

When residing in the location shown in FIG. 4, the FR layer 275 receives as input file-based access-request information from the adjacent file system layer 350 and produces as output the same file-based access-request information that is received by the adjacent storage layer 370. As such, the file system layer 350 outputs the same file-based access-request information and the storage layer 370 receives as input the same file-based access-request information as before, and thus function in the same manner as before and do not require modification to interact with the FR layer 275. When residing in the location shown in FIG. 5, the FR layer 275 receives as input block-based access-request information from the adjacent storage layer 370 and produces as output the same block-based access-request information that is received by the adjacent device driver layer 380. As such, the storage layer 370 outputs the same block-based access-request information and the device driver layer 380 receives as input the same block-based access-request information as before, and thus function in the same manner as before and do not require modification to interact with the FR layer 275.

Although the FR layer 275 may receive and send different access-request information in different formats (e.g., file-based or block-based format) depending on the location of the FR layer 275 in the software stack of the storage operating system 300, the functions of the FR layer 275 described herein are the same regardless of the location of the FR layer 275. Also note that both the file-based and block-based access-request information comprise information regarding a received read/write access request for a particular data set on a primary storage device 125 of the storage system 120. In some embodiments, the data set on a primary storage device 125 comprises fixed-sized blocks of data (e.g., 4 KB or 8 KB blocks).

Figure 6:
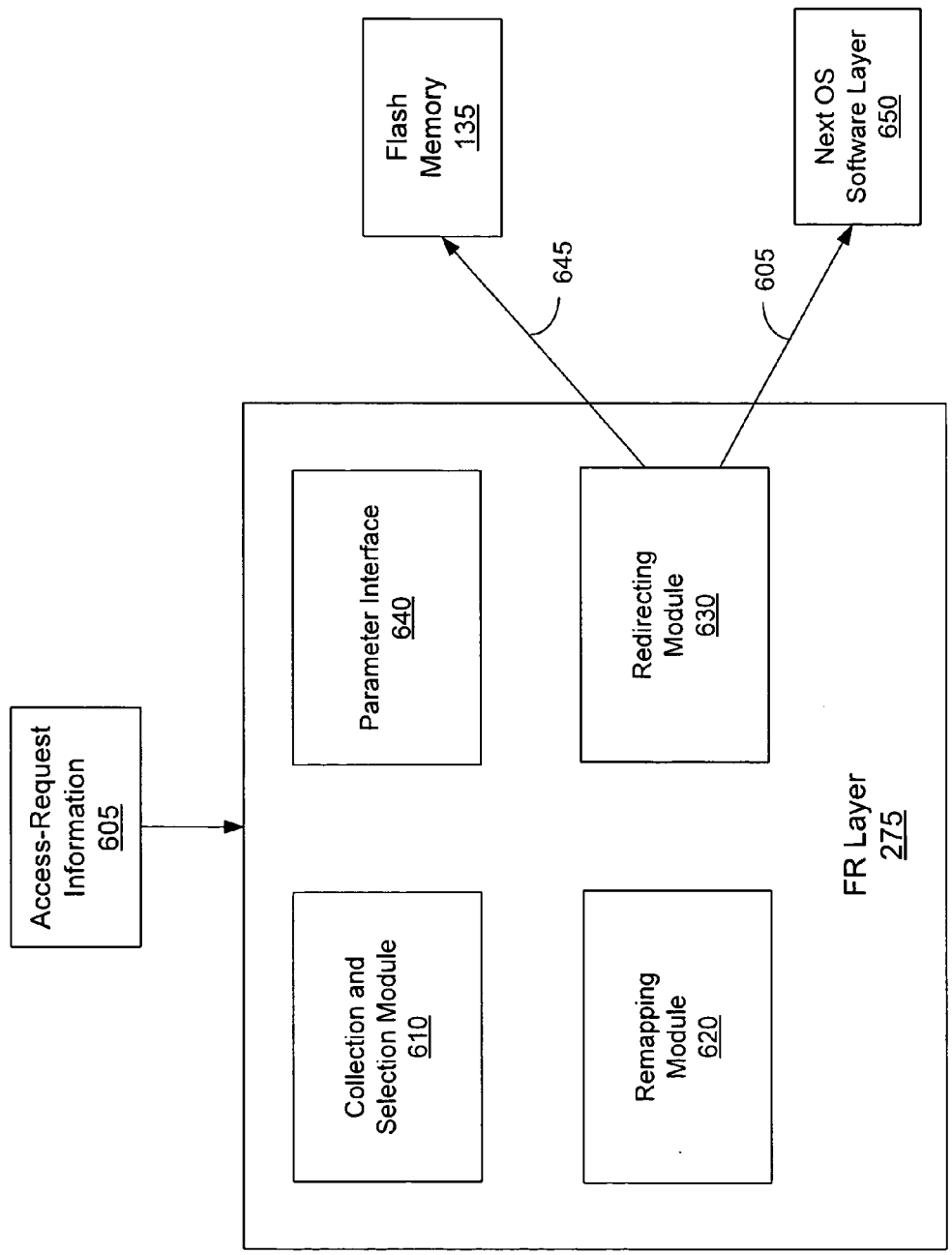
FIG. 6 shows a conceptual diagram of components and operations of the FR layer.

FIG. 6 shows a conceptual diagram of the components and operations of the FR layer 275 according to some embodiments. In some embodiments, the FR layer 275 comprises a collection and selection module 610, a remapping module 620, a redirecting module 630, and a parameter interface 640. The FR layer 275 receives access-request information 605 for a plurality of received access requests for various data on one or more primary storage devices 125 of the storage system 120. In general, the collection and selection module 610 may collect the access-request information 605 and select particular data sets (flash selected data) on the one or more primary storage devices 125 for transfer to flash memory 135. The remapping module 620 may create and maintain a remapping table 290 to record transfers/remappings of flash selected data. The redirecting module 630 may be used to redirect subsequent access requests for flash selected data to the flash memory device 135 using the remapping table 290.

In some embodiments, the collection and selection module 610 collects and classifies the access-request information 605 in a data collection table 280 (e.g., stored in memory 240) according to one or more "collection parameters." A collection parameter may be received by the FR layer that specifies a type of access-request information to be collected and classified by the FR layer. For example, a collection parameter may specify that information regarding all read requests be collected or that all requests from a particular application be collected. As such, collection parameters received by the FR layer may dynamically change the type of access-request information that is to be collected and classified. Using the collected access-request information 605, the collection and selection module 610 may then determine whether particular data sets on the one or more primary storage devices 125 are accessed according to a predetermined access pattern (as specified by one or more pattern parameters). A data set (flash selected data) having the predetermined access pattern may be selected by the FR layer 275 for transfer to flash memory.

The collection and parameter parameters and other various parameters may be stored in a parameter file 285 (e.g., stored in memory 240). The parameters may comprise predetermined default values that configure the default operations of the FR layer 275 in collecting access-request information and determining flash selected data. For example, in some embodiments, default collection parameters may configure the FR layer 275 to collect information regarding random read requests and write requests default pattern parameters may configure the FR layer 275 to select and transfer to flash memory 135 data sets that are accessed frequently by random read requests and accessed infrequently by write requests.

In other embodiments, however, parameters may be received by the FR layer 275 to dynamically change the operational parameters and functions of the FR layer 275. The FR layer 275 may store the received parameters in the parameter file 285. In some embodiments, the parameters are received from a user through the parameter interface 640 which comprises a user interface (such as, a graphical user interface or command line interface). In other embodiments, the parameters are received from a program through the parameter interface 640 which comprises a program interface, such as, an application program interface (API) that inserts parameters into the parameter file 285 programmatically. The received parameters may dynamically change the functions of the FR layer 275 without requiring the software code of the FR layer 275 to be modified to change its functions.

FIG. 7 shows an exemplary parameter file 285 containing various types of parameters that may be received by the FR layer 275. FIG. 7 shows examples of collection parameters 710, each collection parameter specifying a type of access-request information to be collected and classified by the FR layer 275. A non-exhaustive list of exemplary collection parameters include read request, write request, random request, sequential request, or any combination of these. Whether an access request is a read or write request may be determined from the request descriptor contained in the access-request information. Methods well known in the art may be used to classify whether an access request is sequential (where data is accessed in a predetermined, ordered sequence) or random (where data is accessed in non-sequential order). Other collection parameters may include requests from a specific application (e.g., that executes on a server system 110). In other embodiments, other collection parameters are used. In the example of FIG. 7, the collection parameters specify that information regarding all random read requests, all write requests, and requests received from Application Y be collected and classified.

In some embodiments, for each received access request, the FR layer 275 collects and classifies access-request information 605 regarding the access request in a data collection table 280 according to one or more collection parameters. For each received access request, the FR layer 275 may also collect, by default, the address range of the access request and the time the access request was received. FIG. 8 shows an exemplary data collection table 280 that collects and classifies the types of access-request information specified by the collection parameters of FIG. 7. For example, the data collection table 280 collects information regarding all received random read requests and write requests and all requests received from application Y. As such, collection parameters 710 received by the FR layer 275 may dynamically change the type of access-request information that is collected and classified by the FR layer 275.

As shown in the example of FIG. 8, for each access request received by the storage system 120, the FR layer 275 may store the address range of the access request (under the "AR" column), the time the access request was received (under the "Time" column), whether the access request comprises a random read request (indicated as an X under the "RND Read" column) or a write request (indicated as an X under the "Write" column), or was a request received from Application Y (indicated as an X under the "App Y" column). In some embodiments, the address range of the access request specifies a data set on a primary storage device 125 to be accessed by the received access request. For example, the address range may be a file-based address range (comprising a file descriptor, address offset, and data length) or a block-based address range (comprising a logical block address and data size).

In further embodiments, received pattern parameters may dynamically change the predetermined access pattern that determines which data sets on the primary storage devices 125 are chosen as flash selected data. In some embodiments, a pattern parameter may specify a type of access request and a minimum or maximum threshold value. A non-exhaustive list of exemplary types of access requests include read request, write request, random request, sequential request, or any combination of these. The threshold value may indicate a minimum or maximum number of access requests of the specified type that may be received for a data set for it to be selected as flash selected data. In further embodiments, a pattern parameter may specify a time period (T) in which the predetermined access pattern must occur for a data set to qualify as flash selected data.

For example, a first pattern parameter may specify that a minimum threshold value of 25 random-read requests be received for a data set to be selected as flash selected data. A second pattern parameter may further specify that a maximum threshold value of 2 write requests be received for a data set to be selected as flash selected data. A third pattern parameter may further specify, for example, a time period (T) of one hour in which the predetermined access pattern must occur. As such, in the example above, a data set in a primary storage device must receive a minimum of 25 random-read requests and a maximum of 2 write requests within one hour to be selected as flash selected data. Thus, pattern parameters received by the FR layer may dynamically change the predetermined access pattern, which in turn dynamically determines which data sets in the primary storage devices are chosen as flash selected data and transferred to flash memory.

In some embodiments, two or more related pattern parameters comprise a group of related pattern parameters that specify a particular predetermined access pattern. In these embodiments, each parameter in a group of related pattern parameters must be satisfied by a data set on a primary storage device 125 for the data set to be chosen as flash selected data. For example, a group of related pattern parameters may specify a predetermined access pattern to be applied to all received requests or may specify a predetermined access pattern to be applied only to requests received from a particular application.

FIG. 7 shows examples of two groups of related pattern parameters 715 and 720. The first group of related pattern parameters 715 specifies a predetermined access pattern to be applied to all received requests. The first group of related pattern parameters 715 indicates that a data set (address range) of a primary storage device 125 must receive a minimum of 25 random read requests and a maximum of 2 write requests within one hour to be chosen as flash selected data. The second group of related pattern parameters 720 specifies a predetermined access pattern to be applied only to requests received from Application Y. The second group of related pattern parameters 720 indicates that a data set (address range) must receive a minimum of 15 random read requests and a maximum of 4 write requests from Application Y within two hours to be chosen as flash selected data. Note that for each group 715 and 720, each pattern parameter in the group must be satisfied by a data set to be chosen as flash selected data.

In further embodiments, other types of parameter are received by the FR layer 275 and stored to the parameter file 285. For example, an "administrative parameter" may be received that directly specifies a data set (e.g., a file or block address) on a primary storage device 125 that is to be transferred to flash memory 135. For example, if an administrator has already determined that a particular data set on a primary storage device 125 would be accessed from flash memory faster than from the primary storage device 125, the administrator may enter an administrative parameter specifying the particular data set for transfer to flash memory 135. The FR layer 275, in response, may transfer the specified data set to flash memory 135. As such, the administrative parameter may be used to bypass the collecting and selecting steps of the collection and selection module 610 by directly specifying a data set for transfer to flash memory 135. FIG. 7 shows examples of administrative parameters 725 that directly specify flash selected data (e.g., File Addresses F1, F2, F3 and Block Addresses B1, B2, B3).

In some embodiments, the received parameters vary and are determined based on the type of primary storage device 125 (e.g., magnetic tape, disk, etc.) used in the storage system 120. The parameters may vary to appropriately leverage the performance characteristics of flash memory 135 relative to the performance characteristics of the type of primary storage device 125. In these embodiments, a first set of parameters may be input to the FR layer 275 for a first type of primary storage device and a second set of parameters may be input to the FR layer for a second type of primary storage device, wherein the first and second set of parameters comprise one or more different parameter values.

To illustrate, flash memory may provide, relative to a first type of primary storage device, better performance for read requests and worse performance for write requests. In contrast, flash memory may provide, relative to a second type of primary storage device, worse performance for read requests and better performance for write requests. As such, when using the first type of primary storage device, pattern parameters input to the FR layer may specify a high minimum threshold value for read requests and a low maximum threshold value for write requests, thereby causing selection of data sets (for transfer to flash memory) that are accessed frequently by read requests and also accessed infrequently by write requests. In contrast, when using the second type of primary storage device, the parameters input to the FR layer may specify a low maximum threshold value for read requests and a high minimum threshold value for write requests, thereby causing selection of data sets (for transfer to flash memory) that are accessed infrequently by read requests and accessed frequently by write requests.

In some embodiments, the flash selected data (having the predetermined access pattern) may be accessed with lower power consumption and/or lower latency from flash memory than from the primary storage devices. In these embodiments, the predetermined access pattern may be determined based on the performance characteristics of flash memory in comparison to the primary storage device type. For example, as known in the art, relative to disk drives, flash memory has relatively low latency in performing random read requests and relatively high latency in performing write requests (random or sequential). In some embodiments, when the primary storage device is a disk drive, these performance characteristics of flash memory are leveraged by the FR layer by selecting data sets that are accessed frequently by random read requests and accessed infrequently by write requests for transfer to the flash memory.

The collection and selection module 610 continually checks the collected access-request information (e.g., collected and classified in a data collection table 280) for any data sets (address ranges) of the primary storage devices 125 that match a predetermined access pattern (specified by a group of related pattern parameters), whereby a data set matches the predetermined access pattern if it satisfies each pattern parameter in the group. Data sets matching a predetermined access pattern are selected by the collection and selection module 610 as flash selected data. Note that flash selected data may comprise a sub-portion of an address range (indicated under the "AR" column of the data collection table 280) of an access request where only that sub-portion of the address range matches a predetermined access pattern (e.g., where that sub-portion of the address range is found in enough address ranges of other access requests to match the predetermined access pattern).

Referring back to FIG. 6, flash selected data are then transferred to flash memory 135 by the remapping module 620. When transferring flash selected data, the flash selected data is copied from the file system of the primary storage device 125 (on which it was originally stored) and stored to the file system of the flash memory 135. In some embodiments, optionally, after being transferred to flash memory 135, the flash selected data is deleted from the primary storage device 125 on which it was originally stored. In these embodiments, flash selected data is stored only to flash memory 135 and is not concurrently stored on a primary storage device 125. Note that flash selected data may comprise a sub-portion of a file, so that different parts of the same file may be stored on flash memory 135 and on a primary storage device 125.

When flash selected data is transferred to flash memory 135, the remapping module 620 creates a remapping record of the transfer in a remapping table 290 (e.g., stored in memory 240). For each flash selected data, the remapping record may comprise an original address on the primary storage device 125 where the flash selected data was originally stored and a new/remapped address on the flash memory 135 where the flash selected data has been transferred. The original address on the primary storage device 125 may be specified by the file system implemented on the primary storage device 125 and the remapped address on the flash memory 135 may be specified by the file system implemented on the flash memory 135. The original and remapped addresses may comprise file-based or block-based addresses. As such, the remapping module 620 creates and maintains the remapping table 290 to record all transfers/remappings of flash selected data.

In some embodiments, the redirecting module 630 may be used to redirect subsequent access requests for flash selected data to the flash memory device 135 using the remapping table 290. In these embodiments, the redirecting module 630 receives the access-request information 605 for a received access request and determines whether the access request will be directed to a primary storage device 125 or redirected to flash memory 135. Each received access request (and thus the access-request information 605 for the received access request) will typically specify an original address for requested data on a primary storage device 125. The redirecting module 630 may then examine the remapping table 290 to determine if it contains a remapping record containing the original address specified in the access request.

If a remapping record (referred to as a "matching" remapping record) in the remapping table 290 contains the original address specified in the access request, this indicates that the requested data comprises flash selected data that has been transferred/remapped to flash memory 135. As such, the redirecting module 630 will redirect/send the access request to the remapped address (contained in the matching remapping record) in flash memory 135 so that the access request is completed by the flash memory 135. The redirecting module 630 may redirect the access request by replacing the original address with the remapped address in the access-request information 605 to create modified access-request information 645 that is sent to the flash memory 135 for performance of the access request. The flash memory 135 may implement a sub-system to perform the received access request, the sub-system comprising, for example, a file system, device driver, and other software layers for performing access requests.

In some embodiments, any write requests to flash selected data (that are redirected to flash memory 135 by the redirecting module 630) are performed only on the flash memory 135 and are not performed (at any point in time) on the primary storage device 125 on which the flash selected data was originally stored. In these embodiments, the flash memory 135 is being used as a secondary permanent storage device where write operations on the primary storage device 125 where the flash selected data was originally stored would be superfluous and would unnecessarily consume storage system resources.

If a matching remapping record is not found in the remapping table 290, this indicates that the requested data was not transferred/remapped to flash memory 135. As such, the redirecting module 630 will send the access request to the next software layer 650 of the storage operating system 300 so that the access request is processed and completed per usual by the other software layers of the storage operating system 300, whereby the access request is performed on a primary storage device 125. The redirecting module 630 may send the access request to the next software layer 650 by sending the access-request information 605 to the next software layer 650 for processing. The next software layer 650 may comprise, for example, the storage layer 370 or the device driver layer 380.

As described above, for each received access request, the FR layer 275 either redirects the access request to flash memory 135 for completion or sends the access request to the next software layer 650 of the storage operating system 300 for completion (where the same access-request information 605 received by the FR layer 275 is the same access-request information 605 sent to the next software layer 650). As such, in either case, the FR layer 275 is implemented in a way that is transparent to applications sending access requests to the storage system 120 and is implemented without requiring code modification of the other software layers of the storage operating system 300.

III. Methods for Utilizing Flash Memory as Secondary Permanent Storage

Figure 9:
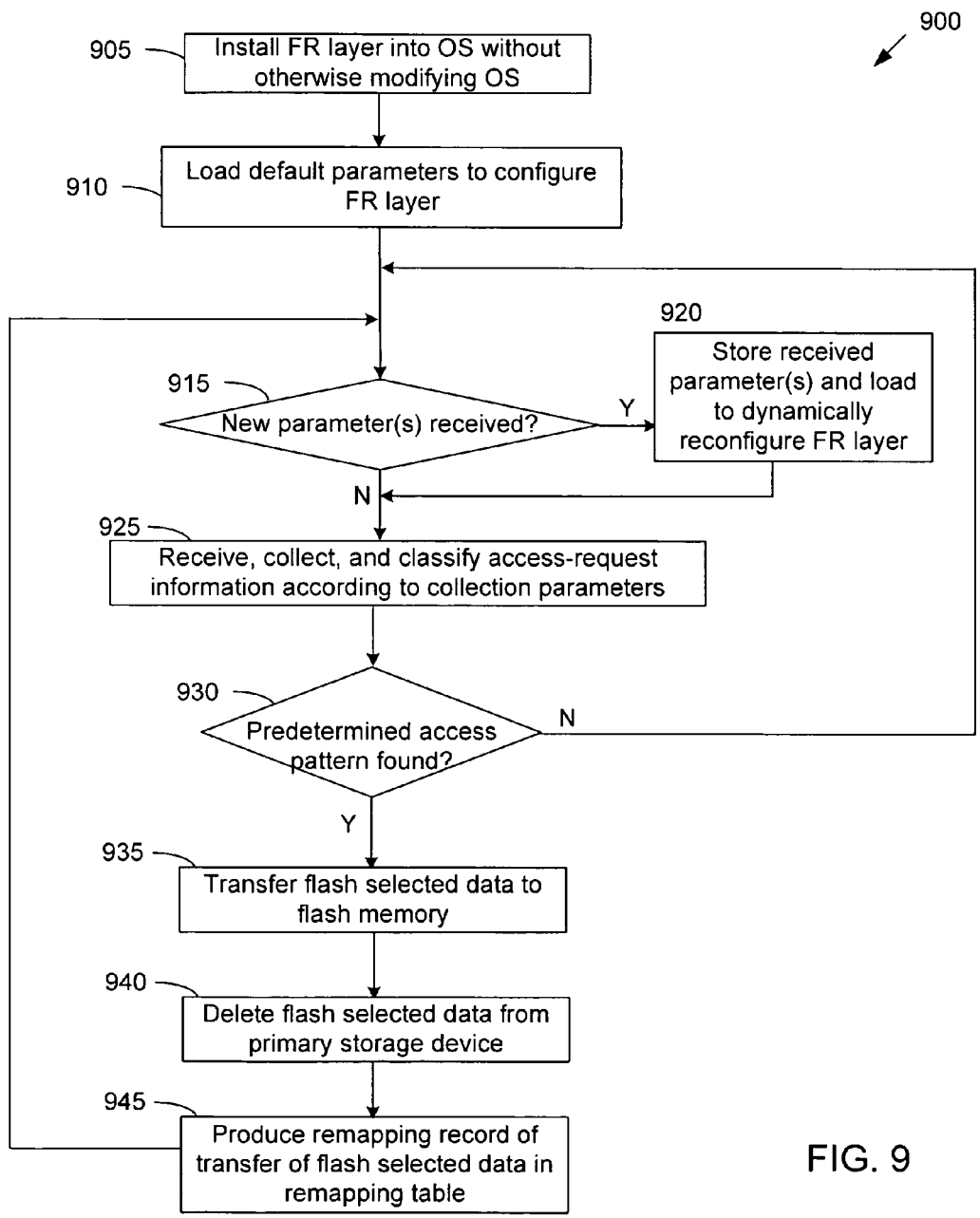
FIG. 9 is a flowchart of a method for selecting and transferring data to flash memory.

FIG. 9 is a flowchart of a method 900 for selecting and transferring data to flash memory 135. In some embodiments, some of the steps of the method 900 are implemented by software or hardware. In some embodiments, some of the steps of method 900 are performed by the collection and selection module 610 and remapping module 620 of the FR layer 275 of the storage operating system 300. In these embodiments, the method 900 may collect access-request information, select and transfer flash selected data to flash memory, and track remappings of flash selected data to flash memory. The order and number of steps of the method 900 are for illustrative purposes only and, in other embodiments, a different order and/or number of steps are used.

In some embodiments, the FR layer 275 may be pre-included in storage operating system 300 software. In other embodiments, at step 905 of the method 900, the FR layer 275 comprises an auxiliary plug-in type software module that is installed onto the storage operating system 300 without otherwise requiring code modification of the storage operating system 300. Default parameters are then loaded (at 910) onto the FR layer 275 to configure the functions of the FR layer 275. The default parameters may be loaded from a parameter file 285. The default parameters may include one or more collection parameters (that specify types of access-information to be collected and classified), one or more pattern parameters (that specify a predetermined access pattern that determines flash selected data), or other parameters. In some embodiments, default collection parameters specify the collection and classification of random read requests and write requests and default pattern parameters specify a predetermined access pattern of a relatively high frequency of random read requests and a relatively low frequency of write requests.

The method 900 then determines (at 915) whether one or more new parameters have been received by the FR layer 275 (e.g., from a user or program through a parameter interface 640 of the FR layer 275). If so, the method stores (at 920) the received parameter(s) in the parameter file 285 and loads them onto the FR layer 275 to dynamically reconfigure the functions of the FR layer 275 according to the received parameter(s). The method 900 then continues at step 925.

If the method 900 determines (at 915—No) that no new operational parameters have been received, the method receives (at 925) access-request information 605 for received access requests for various data on one or more primary storage devices 125 of the storage system 120. The method collects and classifies (at 925) the access-request information 605 according to one or more collection parameters (e.g., in a data collection table 280).

Using the collected access-request information 605, the method 900 determines (at 930) whether any data set on a primary storage device 125 is accessed according to a predetermined access pattern (as specified by one or more pattern parameters). If not, the method continues at step 915. If so, the method 900 selects the data set as flash selected data and transfers (at 935) the flash selected data to flash memory 135. In some embodiments, at step 935, the flash selected data is copied from the file system of the primary storage device 125 on which it was originally stored and is stored to the file system of the flash memory 135. Optionally, the method then deletes (at 940) the flash selected data from the primary storage device 125 on which it was originally stored.

The method produces (at 945) a remapping record of the transfer of the flash selected data in a remapping table 290. In some embodiments, for each transferred flash selected data, the remapping record may comprise an original address on the primary storage device 125 where the flash selected data was originally stored and a new/remapped address on the flash memory 135 where the flash selected data has been transferred. The method 900 then continues at step 915.

Figure 10:
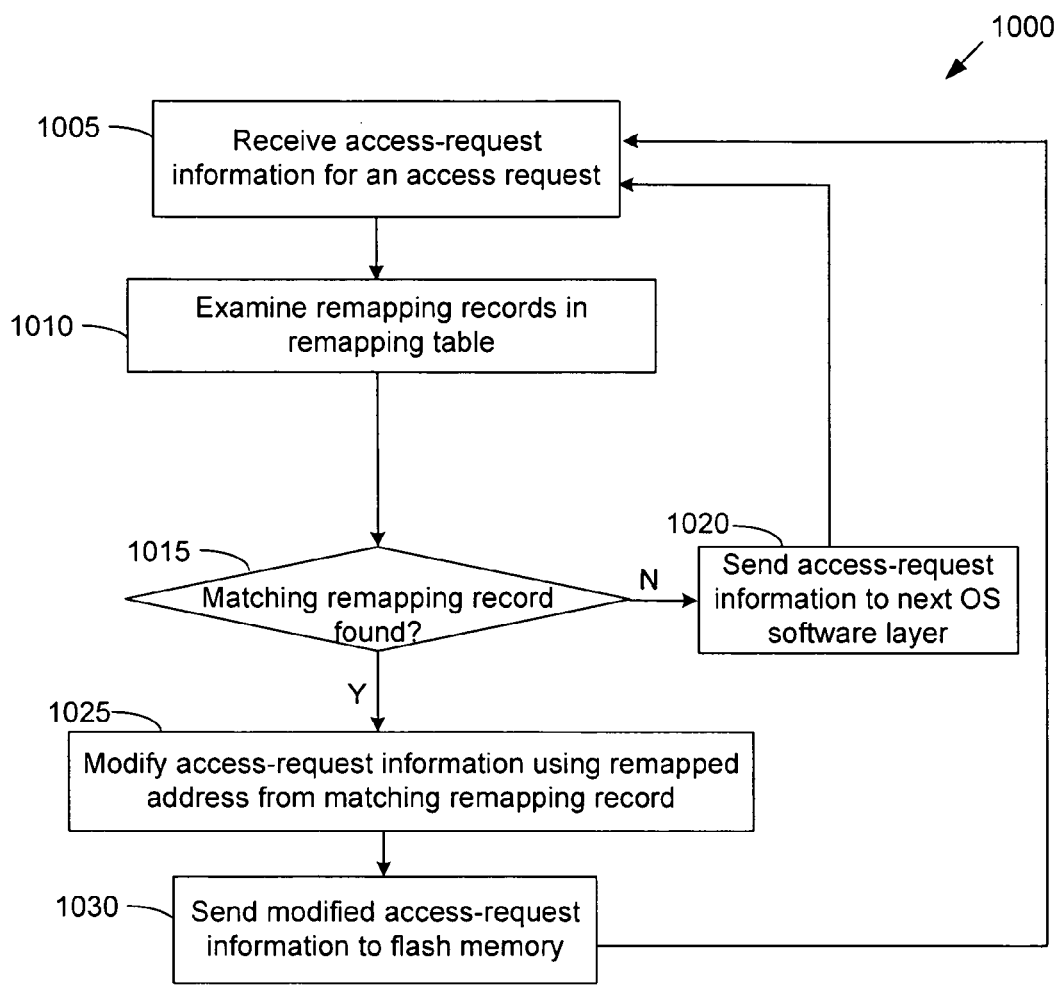
FIG. 10 is a flowchart of a method for redirecting access requests for flash selected data to flash memory.

FIG. 10 is a flowchart of a method 1000 for redirecting access requests for flash selected data to flash memory 135. In some embodiments, some of the steps of the method 1000 are implemented by software or hardware. In some embodiments, some of the steps of method 1000 are performed by the redirecting module 630 of the FR layer 275 of the storage operating system 300. The order and number of steps of the method 1000 are for illustrative purposes only and, in other embodiments, a different order and/or number of steps are used.

The method 1000 receives (at 1005) access-request information 605 for an access request (e.g., received from a server system 110) for data on a primary storage device 125 of the storage system 120. The access-request information 605 may comprise an original address for the requested data on the primary storage device 125. The method then examines (at 1010) the remapping table 290 containing mapping records of transfers of flash selected data, each remapping record comprising an original address on the primary storage device 125 and a remapped address on the flash memory 135 where the flash selected data has been transferred.

The method 1000 then determines (at 1015) whether the remapping table 290 contains a matching remapping record containing the original address in the received access-request information 605. If so, this indicates that the requested data comprises flash selected data that has been transferred/remapped to flash memory 135. As such, the method modifies (at 1025) the received access-request information 605 using the remapped address contained in the matching remapping record (e.g., by replacing the original address with the remapped address).

The method 1000 then sends (at 1030) the modified access-request information 645 to the flash memory 135 for performance of the access request. In some embodiments, any write requests to flash selected data that are redirected to flash memory are performed only on the flash memory 135 and are not performed (at any point in time) on the primary storage device 125 on which the flash selected data was originally stored. The method 1000 then continues at step 1005.

If the method 1000 determines (at 1015—No) that the remapping table 290 does not contain a matching remapping record, this indicates that the requested data has not been transferred/remapped to flash memory 135. As such, the method sends (at 1020) the access request to the next software layer 650 of the storage operating system 300 by sending the access-request information 605 to the next software layer 650 for processing. The next software layer 650 may comprise, for example, the storage layer 370 or the device driver layer 380. Thus, the received access request is processed and completed per usual by the other software layers of the storage operating system 300, whereby the access request is performed on a primary storage device 125. The method 1000 then continues at step 1005.

While the embodiments described herein have been described with reference to numerous specific details, one of ordinary skill in the art will recognize that the embodiments can be embodied in other specific forms without departing from the spirit of the embodiments. Thus, one of ordinary skill in the art would understand that the embodiments described herein are not to be limited by the foregoing illustrative details, but rather are to be defined by the appended claims.

We claim:

1. A system for using flash memory as a secondary storage device in a storage system, the system comprising:
    the storage system comprising:
        a first set of one or more primary storage devices of a first storage device type;
        a second set of one or more primary storage devices of a second storage device type that is different than the first storage device type;
        the flash memory; and
        an operating system for processing access-request information regarding received access requests for various data on the first and second sets of primary storage devices, the operating system comprising a flash remapping (FR) layer for using the flash memory as a secondary storage device, the FR layer configured for:
            collecting, according to a set of one or more collection parameters, the access-request information regarding the received access requests;
            based on the collected access-request information, determining flash selected data comprising areas of data in the first set of primary storage devices exhibiting a first predetermined access pattern, the first predetermined access pattern being specified by a first set of one or more pattern parameters specified for the first set of primary storage devices;
            transferring flash selected data from the first set of primary storage devices to the flash memory;
            based on the collected access-request information, determining flash selected data comprising areas of data in the second set of primary storage devices exhibiting a second predetermined access pattern, the second predetermined access pattern being specified by a second set of one or more pattern parameters specified for the second set of primary storage devices, wherein the first predetermined access pattern specified for the first set of primary storage devices is different from the second predetermined access pattern specified for the second set of primary storage devices; and
            transferring flash selected data from the second set of primary storage devices to the flash memory.

2. The system of claim 1, wherein the FR layer is further configured for:
    for received access requests for data transferred to the flash memory, redirecting the access requests to the flash memory for performance of the access request.

3. The system of claim 1, wherein the FR layer is configured to transfer flash selected data from the set of primary storage devices to the flash memory by:
    copying the flash selected data stored on the set of primary storage devices;
    storing the flash selected data on the flash memory; and
    deleting the flash selected data on the set of primary storage devices, wherein subsequent received write requests for the flash selected data are performed only on the flash memory and not on the set of primary storage devices.

4. The system of claim 1, wherein:
    a collection parameter specifies a type of access-request information to be collected and classified by the FR layer; and
    a pattern parameter specifies a type of access request and a minimum or maximum threshold value indicating a minimum or maximum number of access requests of the specified type that is received for an area of data for the area of data to qualify as flash selected data.

5. The system of claim 1, wherein the collection or pattern parameters are based on performance characteristics of flash memory relative to the primary storage device.

6. A method for using flash memory as a secondary storage device in a storage system, the storage system comprising the flash memory, a first set of one or more primary storage devices of a first storage device type, a second set of one or more primary storage devices of a second storage device type that is different than the first storage device type, and an operating system for processing access-request information regarding received access requests for various data on the first and second sets of primary storage devices, the method comprising:

collecting, according to a set of one or more collection parameters, the access-request information regarding the received access requests;

based on the collected access-request information, determining flash selected data comprising areas of data in the set of primary storage devices exhibiting a predetermined access pattern for the first application, the predetermined access pattern for the first application being specified by a first set of one or more pattern parameters specified for only the first application;

based on the collected access-request information, determining flash selected data comprising areas of data in the first set of primary storage devices exhibiting a first predetermined access pattern, the first predetermined access pattern being specified by a first set of one or more pattern parameters specified for the first set of primary storage devices;

transferring flash selected data from the first set of primary storage devices to the flash memory;

based on the collected access-request information, determining flash selected data comprising areas of data in the second set of primary storage devices exhibiting a second predetermined access pattern, the second predetermined access pattern being specified by a second set of one or more pattern parameters specified for the second set of primary storage devices, wherein the first predetermined access pattern specified for the first set of primary storage devices is different from the second predetermined access pattern specified for the second set of primary storage devices; and transferring flash selected data from the second set of primary storage devices to the flash memory.

7. The method of claim 6, further comprising:
for received access requests for data transferred to the flash memory, redirecting the access requests to the flash memory for performance of the access request.

8. The method of claim 6, wherein the transferring comprises:
copying the flash selected data stored on the set of primary storage devices;
storing the flash selected data on the flash memory; and
deleting the flash selected data on the set of primary storage devices, wherein subsequent received write requests for the flash selected data are performed only on the flash memory and not on the set of primary storage devices.

9. The method of claim 6, wherein:
a collection parameter specifies a type of access-request information to be collected and classified; and
a pattern parameter specifies a type of access request and a minimum or maximum threshold value indicating a minimum or maximum number of access requests of the specified type that is received for an area of data for the area of data to qualify as flash selected data.

10. The method of claim 6, wherein the collection or pattern parameters are based on performance characteristics of flash memory relative to the primary storage device.

11. A system for using flash memory as a secondary storage device in a storage system, the system comprising:
the storage system comprising:
a first set of one or more primary storage devices of a first storage device type;
a second set of one or more primary storage devices of a second storage device type that is different than the first storage device type;
the flash memory; and
an operating system comprising a plurality of software layers for processing access-request information regarding received access requests for various data on the set first and second sets of primary storage devices, the plurality of software layers comprising a flash remapping (FR) layer configured for:
installation onto the operating system for using the flash memory as a secondary storage device without requiring code modification of the other software layers of the operating system;
collecting, according to a set of one or more collection parameters, the access-request information regarding the received access requests;
based on the collected access-request information, determining flash selected data comprising areas of data in the first set of primary storage devices exhibiting a first predetermined access pattern, the first predetermined access pattern being specified by a first set of one or more pattern parameters specified for the first set of primary storage devices;
transferring flash selected data from the first set of primary storage devices to the flash memory;
based on the collected access-request information, determining flash selected data comprising areas of data in the second set of primary storage devices exhibiting a second predetermined access pattern, the second predetermined access pattern being specified by a second set of one or more pattern parameters specified for the second set of primary storage devices, wherein the first predetermined access pattern specified for the first set of primary storage devices is different from the second predetermined access pattern specified for the second set of primary storage devices; and
transferring flash selected data from the second set of primary storage devices to the flash memory.

12. The system of claim 11, wherein the FR layer is further configured for:
for received access requests for data transferred to the flash memory, redirecting the access requests to the flash memory for performance of the access request.

13. The system of claim 11, wherein the FR layer is further configured for:
receiving as input access-request information from a prior adjacent layer of the storage operating system; and
for received access requests for data not transferred to the flash memory, sending as output the same access-request information received as input to a next adjacent layer of the storage operating system.

14. The system of claim 13, wherein:
the prior adjacent layer comprises a file system layer and the next adjacent layer comprises a storage layer of the operating system, wherein the access-request information comprises file-based access-request information; or
the prior adjacent layer comprises the storage layer and the next adjacent layer comprises a device driver layer of the operating system, wherein the access-request information comprises block-based access-request information.

15. The system of claim 11, wherein the FR layer is configured to transfer flash selected data from the set of primary storage devices to the flash memory by:
copying the flash selected data stored on the set of primary storage devices;
storing the flash selected data on the flash memory; and
deleting the flash selected data on the set of primary storage devices, wherein subsequent received write requests for the flash selected data are performed only on the flash memory and not on the set of primary storage devices.

16. A method for using flash memory as a secondary storage device in a storage system, the storage system comprising the flash memory, a first set of one or more primary storage devices of a first storage device type, a second set of one or more primary storage devices of a second storage device type that is different than the first storage device type, and an operating system comprising a plurality of software layers for processing access-request information regarding received access requests for various data on the set first and second sets of primary storage devices, the method comprising:

providing a flash remapping (FR) layer configured for:

installation onto the operating system for using the flash memory as a secondary storage device without requiring code modification of the other software layers of the operating system;

collecting, according to a set of one or more collection parameters, the access-request information regarding the received access requests;

based on the collected access-request information, determining flash selected data comprising areas of data in the first set of primary storage devices exhibiting a first predetermined access pattern, the first predetermined access pattern being specified by a first set of one or more pattern parameters specified for the first set of primary storage devices;

transferring flash selected data from the first set of primary storage devices to the flash memory;

based on the collected access-request information, determining flash selected data comprising areas of data in the second set of primary storage devices exhibiting a second predetermined access pattern, the second predetermined access pattern being specified by a second set of one or more pattern parameters specified for the second set of primary storage devices, wherein the first predetermined access pattern specified for the first set of primary storage devices is different from the second predetermined access pattern specified for the second set of primary storage devices; and transferring flash selected data from the second set of primary storage devices to the flash memory.

17. The method of claim 16, wherein the FR layer is further configured for:

for received access requests for data transferred to the flash memory, redirecting the access requests to the flash memory for performance of the access request.

18. The method of claim 16, wherein the FR layer is further configured for:

receiving as input access-request information from a prior adjacent layer of the storage operating system; and for received access requests for data not transferred to the flash memory, sending as output the same access-request information received as input to a next adjacent layer of the storage operating system.

19. The method of claim 18, wherein:

the prior adjacent layer comprises a file system layer and the next adjacent layer comprises a storage layer of the operating system, wherein the access-request information comprises file-based access-request information; or the prior adjacent layer comprises the storage layer and the next adjacent layer comprises a device driver layer of the operating system, wherein the access-request information comprises block-based access-request information.

20. The method of claim 16, wherein the FR layer is configured to transfer flash selected data from the set of primary storage devices to the flash memory by:

copying the flash selected data stored on the set of primary storage devices;

storing the flash selected data on the flash memory; and deleting the flash selected data on the set of primary storage devices, wherein subsequent received write requests for the flash selected data are performed only on the flash memory and not on the set of primary storage devices.

\* \* \* \* \*